United States Patent [19]

von der Weid

[11] 4,369,025

[45] Jan. 18, 1983

[54] APPARATUS FOR MANUFACTURING ELEMENTS BY MEANS OF A HARDENABLE BINDING AGENT TO WHICH A LIQUID IS ADDED

[75] Inventor: François P. von der Weid, Geneva, Switzerland

[73] Assignee: EPSI Brevets et Participations S.A., Fribourg, Switzerland

[21] Appl. No.: 159,228

[22] Filed: Jun. 13, 1980

Related U.S. Application Data

[63] Continuation of Ser. No. 948,748, Oct. 5, 1978, abandoned.

[30] Foreign Application Priority Data

Feb. 13, 1978 [CH] Switzerland ........................ 1551/78

[51] Int. Cl.[3] ............................................ B29C 27/14

[52] U.S. Cl. .................................... 425/115; 425/130; 264/113; 264/128

[58] Field of Search ........................ 425/115, 130, 145; 264/113, 128

[56] References Cited

U.S. PATENT DOCUMENTS

| | | | |
|---|---|---|---|
| 1,862,318 | 6/1932 | Ruby | 425/130 |
| 3,383,442 | 5/1968 | Mountain | 425/115 |
| 4,104,340 | 8/1978 | Ward | 264/113 |

*Primary Examiner*—James R. Hall

*Attorney, Agent, or Firm*—Fisher, Christen & Sabol

[57] ABSTRACT

The invention relates to apparatus for manufacturing elements made of a hardenable binding agent, wherein this element is obtained by successive deposits of the dry binding agent in powder form, each deposit being followed by a wetting. The invention is applicable to the production of construction elements, such as plates, tiles, etc.

8 Claims, 5 Drawing Figures

Figure 1:
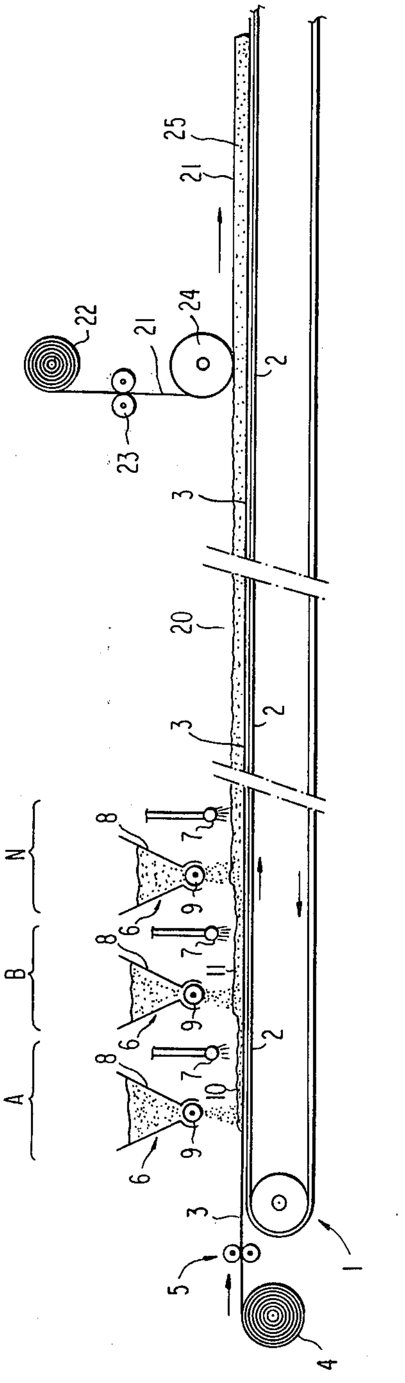

APPARATUS FOR MANUFACTURING ELEMENTS BY MEANS OF A HARDENABLE BINDING AGENT TO WHICH A LIQUID IS ADDED

This is a continuation of application Ser. No. 948,748, filed Oct. 5, 1978, now abandoned.

The present invention relates to apparatus for manufacturing elements, particularly construction elements such as plates, tiles, etc. made of a hardenable binding agent such as plaster or the like.

An apparatus is already known for the mass production of this sort. This known apparatus comprises a long endless conveyor belt, at an upstream point of which wet plaster possibly containing glue based on starch is continuously poured, as well as devices for continuously supplying sheets of paper and at least one rolling and shaping device comprising rollers. Due to such an arrangement, a continuous flat strip of plaster is obtained, coated on its faces with sheets of paper adhering thereto due to the presence of glue in the plaster, this glue tending to migrate towards the outside as the plaster dries. This continuous strip, after the plaster has set, is then cut transversely with respect to its direction of advance to form the desired plates or tiles. In such an installation, it is necessary that the mass of wet plaster poured onto the endless belt be very malleable in order to be able to be shaped by rolling. This is obtained by the addition of a large quantity of water to the plaster in powder form, at the moment of mixing. In the wet plaster, there is approximately one part of water for one part of powdered plaster.

This high proportion of water, which is much in excess for the plaster to set (16 to 18% of the quantity of water added would be sufficient), has for its effect on the one hand to increase the setting time, i.e. in fact to necessitate a very long belt, since the continuous strip cannot be cut up into individual elements until after the plaster has set. On the other hand, the individual elements thus manufactured are considerably loaded with water, and a great deal of energy must be expended to dry them. Such a drying is obtained by passage in a tunnel oven which is disposed downstream of said endless belt and of which the length is similar to that of the belt, despite the passage of a plurality of plates disposed abreast.

This excess of water therefore involves high equipment costs (long length of the endless belt and presence of a long drying oven) and high energy costs (drying of the elements manufactured). This results in the cost price of the elements thus manufactured being high.

It is an object of the present invention to remedy these drawbacks.

It enables construction elements of the above-mentioned type to be obtained at low cost prices, due to considerable reductions in the cost of equipment, manpower and energy. These savings in equipment, manpower and energy are possible, as, according to the invention, only the quantity of water necessary for setting (about 16 to 18% of the quantity used in the known process) is used for forming the elements, this enabling the drying device of the known apparatus to be eliminated and thus facilitating the watching and maintaining of the apparatus.

To this end, according to the invention, the apparatus for the manufacture of an element made of hardenable binding agent to which a liquid is added, such as plaster or the like, is noteworthy in that said element is obtained by successive elementary deposits of the dry binding agent in powder form, each elementary deposit being followed by a wetting.

Thus, due to the invention, it is possible to use only the quantity of liquid necessary for the binding agent to set, since it is not a wet mixture having to be shaped which is used, but on the contrary superposed and successively deposited layers. In the case of plaster, the quantity of water used for wetting is at the most equal to 20% by weight of the quantity of dry plaster in powder form of the immediately preceding deposit. Furthermore, each deposit of dry binding agent in powder form and each wetting are advantageously uniform over the width and length of said element.

Each uniform deposit of dry binding agent in powder form may have a thickness of between about 0.1 and 10 mm and be effected by sprinkling, with a dropping height of for example between 0.1 and 3 meters. Moreover, each wetting may be effected by spraying from a height of between about 0.1 and 1.5 meters. Thus, the deposits and wettings are effected by degrees, thus improving the quality of the products obtained. To this end, the distance between a point of deposit and the immediately consecutive wetting point is advantageously between about 0.5 and 1.5 meters, while the distance between a point of wetting and a following point of deposit is between about 0.5 and 2 meters.

For carrying out the invention, an apparatus may be used which comprises a conveyor belt animated by an advance movement on which a continuous strip is formed which is subsequently cut up into elements, said apparatus being noteworthy in that, above said conveyor are arranged a plurality of dispensers of dry binding agent in powder form and of wetting devices, distributed in pairs, each pair comprising a dispenser of dry binding agent in powder form and a wetting device placed downstream of said dispenser.

Each dispenser of dry binding agent in powder form extends transversely with respect to the conveyor and may comprise a doser, for example a rotary and/or vibrated doser, to regulate the flow of binding agent, while each wetting device may be constituted by at least one wetting ramp transverse with respect to said conveyor.

The apparatus for carrying out the invention may comprise means for disposing on the conveyor a support, fast therewith in displacement and adapted to receive the deposits of binding agent with a view to forming said strip and means for gluing the interface between said deposit support and the strip. Such a support may for example be constituted by a sheet of paper, a band or plates of insulating material, etc. The apparatus according to the invention may also comprise means for disposing a coating on the upper face of said strip, means for gluing the interface between the coating and the strip and means for rolling said strip provided with its coating. Such a coating may also be constituted by a sheet of paper, a band or plates of insulating material, etc.

Said conveyor may also be made of a non-stick material and the successive and alternate deposits and wettings may be effected directly on the conveyor. In this case, in order to reduce the adhesion of the first layers of the strip on the conveyor it is advantageous to provide a supplementary wetting device upstream of the first pair of dispensers and wetting devices.

In a variant embodiment of the apparatus for carrying out the invention, said apparatus comprises, on the one hand, a table animated by a reciprocating movement and, on the other hand, disposed above said table, at least one dispenser of dry binding agent in powder form, associated with at least one wetting device.

In such a variant, a distributor of dry binding agent in powder form is preferably provided to be associated with two wetting devices disposed on either side of said dispenser and each supplying half quantity of liquid necessary for wetting an elementary deposit.

In particular, when it is desired to provide said elements with ribs and/or grooves in their edges for fitting purposes, it is possible to provide machining tools at a fixed station along the path of the conveyor.

The invention will be more readily understood on reading the following description with reference to the accompanying drawings, in which:

FIG. 1 schematically and partially illustrates an apparatus according to the invention for obtaining a product which is smooth on its opposite large sides.

Figure 2:
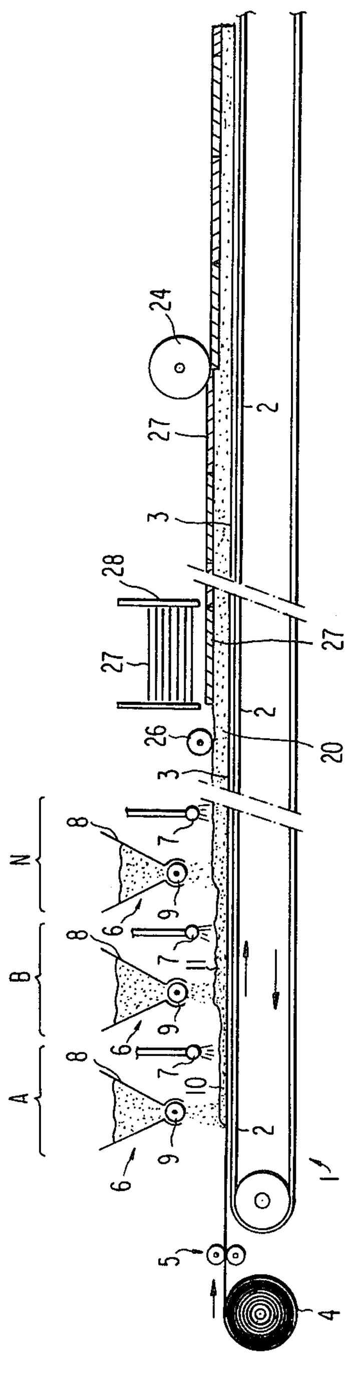
Figure 3:
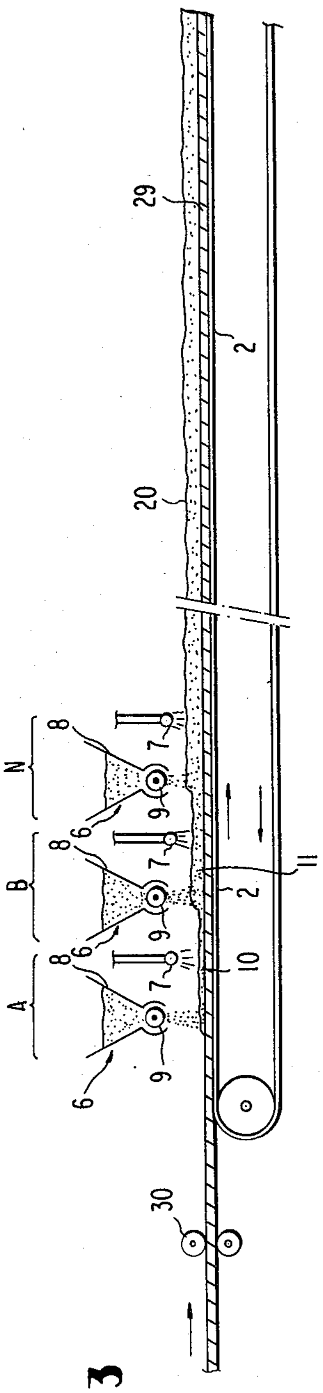

FIGS. 2 and 3 schematically and partially illustrate different apparatus according to the invention for obtaining a product coated with an insulating coating on one of its large surfaces.

Figure 4:
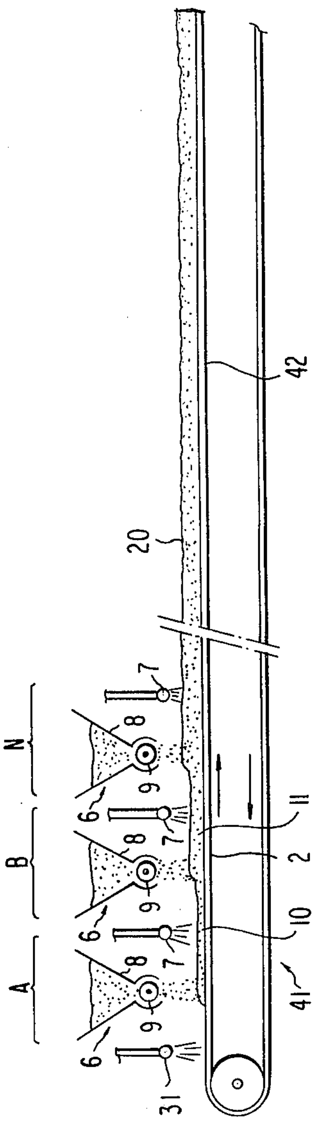

FIG. 4 schematically and partially illustrates a variant embodiment of an apparatus according to the invention for obtaining a bare product.

Figure 5:
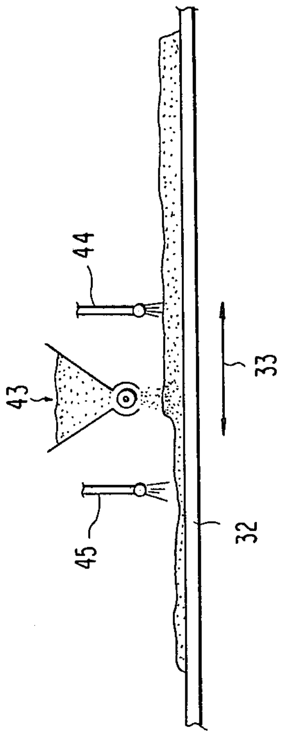

FIG. 5 schematically and partially illustrates another variant embodiment of an apparatus according to the invention, using a reciprocating table.

In these Figures, like references denote like elements.

Referring now to the drawings, the apparatus shown schematically in FIG. 1 comprises an endless conveyor belt 1, of which the upper flight 2 moves from left to right in said Figure and serves as a support conveyor for carrying out the process according to the invention.

A sheet of paper 3, coming from a reel 4, is applied on the conveyor flight 2 and is obliged to move therewith. Before being applied to the conveyor flight 2, the sheet of paper 3 is glued on its upper face opposite the conveyor flight 2 by a gluing device 5.

Above the conveyor flight 2 is disposed a plurality of paired dispensing stations A, B and N, each of which comprises a dispenser 6 of dry plaster in powder form and a water-spraying device 7, and placed successively along said conveyor flight 2. In each pair of dispensing stations, the water spray device 7 is found downstream (with respect to the direction of advance of the conveyor) with respect to the plaster dispenser 6 and each spray device 7 extends transversely with respect to the sheet of paper 3, over the whole width thereof. Each plaster dispenser 6 may be constituted for example by a hopper 8 containing dry plaster and of which the dispensing opening is a slot transverse with respect to the sheet 3, made in a cylindrical housing disposed in the lower part of the hopper 8, in which housing is disposed at least one doser drum 9. Thus, the rate of flow of the plaster dispensed by the dispenser 6 is adjustable by the speed of rotation of the doser drum 9.

In an experimental installation having given complete satisfaction, the dispensing opening of the dispensers 6 was disposed about 10 cm above the conveyor flight 2. Similarly, in this experimental installation, the distance between a dry plaster dispenser 6 and the spray device 7 associated therewith was about 1 meter, while each spray device 7 was disposed at about 10 cm above the conveyor flight 2 and the distance between two adjacent pairs 6,7 was close to 1.5 meters. Each spray device 7 may be constituted by one or more spray ramps transverse with respect to the sheet 3 and supplied with water from a source (not shown) having a controlled flow.

Thus, the sheet of paper 3 continuously moving beneath the stations A, B and N due to the conveyor flight 2, the first dispenser 6 of station A (the one located upstream) deposits on the sheet of paper 3 a first uniform elementary layer 10 of dry plaster in powder form, on which the first spray device 7 of station A (the one downstream, immediately after the first dispenser 6) uniformly sprays plain water or water to which additives have been added. On the elementary layer of plaster 10 thus wetted and not yet set, the second dispenser 6 of station B, immediately downstream of the first spray device 7 of station A, deposits a second uniform elementary layer of dry plaster in powder form, so as to obtain a thicker layer 11. On this layer 11, the second spray device 7 of station B uniformly sprays plain water or water with additives added thereto. The same operations are repeated as before with as many dispensing stations N as desired, so that, downstream of the assembly of said dispensing stations, each including a dispenser of dry plaster 6 and a spray device 7, a thick layer 20 is obtained, formed by successive deposits of elementary layers of dry plaster, each deposit having been immediately followed by a wetting, the alternating of the deposits and wettings being such that a deposit of dry plaster in powder form is always effected on an elementary layer of plaster which is wet but not yet set.

The tests carried out with the experimental installation mentioned hereinabove have shown that, for each each of the dispensing stations, A, B and N, the flow of water by weight of the spray device 7 could be reduced to less that 20% of the flow of dry plaster in powder form from dispenser 6. Furthermore, these tests have also shown that it was advantageous if the rate of flow of each dispenser 6 were adjusted, as a function of the speed of advance of the sheet of paper 3, for each elementary layer of plaster 10 to have a thickness of between 0.1 and 10 mm.

Then, on the upper face of the thick layer 20 there is applied a sheet of paper 21, coming from a reel 22 and previously glued on its face directed towards the thick layer 20 by a gluing device 23. The application of the glued paper sheet 21 on the thick layer 20 is obtained by means of a presser roller 24, enabling the upper face of the thick layer 20 to be smoothed and serving as rolling mill to regulate the thickness of said thick layer. In this way, a flat strip of plaster 25 is obtained which sets while advancing.

As soon as the flat strip 25 has set, it is cut up into sections, in known manner, each section forming a construction element such as a tile, plate etc., these sections not requiring passage in a special drying device before their subsequent use.

As soon as the strip 25 or the sections obtained by cutting same have set, it is possible to machine them, for example to make ribs and/or grooves in their edges for fitting purposes. Such a machining may be effected by cutting tools (not shown) disposed at a fixed station along the path of the mobile conveyor flight 2.

Due to the apparatus according to the invention, illustrated in FIG. 2, elements may be produced which are coated on one of their faces with an insulating layer. To this end, in the same way as indicated in FIG. 1, a thick layer 20 is made by employment of the dispensing stations A, B and N, resting, on the sheet of paper 3, which itself rests on the conveyor flight 2. Then, due to a gluing device 26, a layer of glue is deposited on the upper face of the thick layer 20, after which an insulating coating 27 is applied, for example in the form of plates made of expanded polystyrene or glass wool, on said glued upper face, the plates forming the insulating coating 27 coming from a dispenser 28. The composite thick layer 20,27 is then subjected to the action of the presser roller 24, which presses the coating 27 against the thick layer 20 and determines the thickness of the flat composite strip thus obtained.

In the variant embodiment shown in FIG. 3, the elementary layers of plaster 10 are deposited on the upper face of a support 29, for example made of an insulating foam, applied to the conveyor flight 2 and taken along thereby. Prior to the successive and alternate deposits of plaster and wettings, the upper face of the support 29 is glued by means of a gluing device 30. Downstream of the pairs 6,7, a composite strip is thus obtained comprising a thick layer of plaster 20 fast with the support 29 on its lower face. Possibly, on the upper face of the thick layer 20 and before it sets, a sheet of glued paper 21 may be applied by means of a presser cylinder 24, as shown in FIG. 1. The support 29 may be constituted either by a continuous sheet coming directly from a machine, or by individual plates introduced successively on the conveyor flight 2.

The installation shown in FIG. 4 comprises an endless belt 41 made of a non-stick material. In this case, it is possible to effect the deposits of plaster directly on the upper conveyor flight 42. However, it is preferable to provide a supplementary wetting device 31, upstream of the first plaster dispenser 6, in order to reduce the adhesion of the first elementary layer 10 on the conveyor 2. In this case, a strip is obtained, composed simply of the thick layer 20, the lower face of which is bare.

The upper face of said thick layer 20 may either be left bare, or be coated with a coating then rolled. The upper non-stick face of the conveyor flight 42 may comprise demouldable barbs or points to form cavities in the lower face of the thick layer 20.

In the variant embodiment of the installation according to the invention shown in FIG. 5, a table 32 has been provided, which is animated by a horizontal reciprocating movement, shown schematically by double arrow 33. Above the reciprocating table 32 are mounted, at a fixed station, a dispenser 43 of dry plaster in powder form similar to the previously described dispensers 6 and at least one wetting device 7.

One wetting device 44 only may be used on condition that an alternative control be provided therefor such that it supplies liquid only in one of the directions of displacement of the table. It is, however, preferable if the installation of FIG. 5 comprises two wetting devices 44 and 45, disposed on either side of the dispenser 6 and each supplying half of the quantity of liquid necessary for wetting an elementary layer of deposit.

The present invention is, of course, not limited to the embodiments described hereinabove.

Although examples for carrying out the process of the invention have been described hereinabove which suggest that the elements or strips obtained present a flat rectangular section, it is obvious that the present invention is not limited to obtaining strips or elements presenting such a section. In fact, by adjusting the deposit support surface and/or the dispensing of the binding agent, and by possibly disposing covers, shims, stops, etc., it is possible to obtain strips or elements of any desired section.

I claim:

1. Apparatus for manufacturing solid strips of material from hardenable binding agent and a liquid, comprising;

endless belt conveyor means movable in one direction to support a length of said strip material;

a plurality of dispensing stations disposed above said conveyor belt means and along the length thereof, each station comprising;

first dispensing means to deposit a first uniform layer of dry powdered binding agent on said conveyor means while moving, said layer comprising a fraction of the thickness of the strip to be manufactured, and;

second dispensing means downstream of said first dispensing means to deposit an amount of said liquid necessary for the binding agent to set while the conveyor means is moving.

2. Apparatus as defined in claim 1 which includes means to deposit a continuous length of supporting material on said conveyor belt means upstream of all of said dispensing stations, said supporting material being movable with said conveyor means to receive the materials deposited by the dispensing stations, and means for glueing together said supporting material and said deposited materials at the interface therebetween.

3. Apparatus as defined in claim 1, wherein the surface of said endless belt conveyor means comprises a non-stick material, and means is provided for supplying a wetting material to said surface upstream of all of said dispensing stations.

4. Apparatus as defined in claim 1, which includes means to apply a layer of coating material to the upper surface of the materials deposited on said conveyor means by said dispensing stations, means for glueing together said coating material and said deposited materials at the interface therebetween, and means downstream of the dispensing means for rolling said materials while the conveyor means is moving.

5. Apparatus for manufacturing solid strips of material from hardenable binding agent and a liquid, comprising:

table means reciprocable in opposite directions in a predetermined path;

dispensing means disposed above said table means for depositing a succession of uniform layers of dry powered binding agent on said table means while moving, each said layer being a fraction of the thickness of the strip to be manufactured, and;

at least one dispensing means for depositing an amount of said liquid necessary for the finding agent to set on the exposed surface of the dry binding agent previously deposited on said table means.

6. Apparatus as defined in claim 5, which includes two means for dispensing controlled amounts of said liquid on the surfaces of successive deposits of dry binding agent, said last-mentioned dispensing means being disposed at the respective opposite sides of the first-mentioned dispensing means with respect to the path of movement of said table, each supplying one-half the total quantity of liquid required for the manufactured strip.

7. Apparatus as defined in either one of claims 1, or 5, wherein said means for dispensing hardenable binder in the form of dry powder is provided with elongated outlet means which extends transversely with respect to the width of the conveyor means or reciprocable table means, and includes doser means for regulating the flow of said dry powder.

8. Apparatus as defined in either of claims 1, or 5, wherein said means for dispensing liquid is provided with elongated outlet means extending transversely with respect to the conveyor means or reciprocable table means for adjusting the flow of said liquid.

* * * * *